United States Patent [19]
Imamura

[11] Patent Number: 5,855,140
[45] Date of Patent: Jan. 5, 1999

[54] MOTOR DEVICE

[75] Inventor: Takayuki Imamura, Hamamatsu, Japan

[73] Assignee: ASMO Co. Ltd., Kosai, Japan

[21] Appl. No.: 798,141

[22] Filed: Feb. 12, 1997

[30] Foreign Application Priority Data

Feb. 19, 1996 [JP] Japan .................................. 8-055574

[51] Int. Cl.$^6$ ........................ F16H 21/40; F16H 57/02; B60S 1/24
[52] U.S. Cl. ........................ 74/42; 15/250.3; 74/606 R
[58] Field of Search ............... 74/42, 43, 606 R; 15/250.3

[56] References Cited

U.S. PATENT DOCUMENTS

| 5,203,219 | 4/1993 | Blanchet ........................... 74/42 |
| 5,622,077 | 4/1997 | Blanchet et al. .................... 74/42 |

FOREIGN PATENT DOCUMENTS

| 23 40 090 | 2/1975 | Germany . |
| 80 01 379.2 | 7/1981 | Germany . |
| 32 47 421 | 9/1986 | Germany . |
| 4-69358 | 6/1992 | Japan . |
| 4-292244 | 10/1992 | Japan . |
| 4-127061 | 11/1992 | Japan . |
| 5-52421 | 7/1993 | Japan . |

*Primary Examiner*—Allan D. Herrmann
*Attorney, Agent, or Firm*—Oblon, Spivak, McClelland, Maier & Neustadt, P.C.

[57] ABSTRACT

A motor device having a hollow casing in which a mechanism for converting continuous rotational motion of a rotating member which is rotated by a motor into reciprocating oscillatory motion and reversibly rotates the output shaft in the forward rotational direction and in the reverse rotation direction. This motor device includes a gear wheel fixed to the output shaft. Furthermore, it includes a driving force conversion member comprising a meshing portion which is meshed with the gear wheel, which converts continuous rotational motion of the rotating member into oscillatory motion around the output shaft as a center for oscillation, and which reversibly rotates the gear wheel in the forward rotational direction and in the reverse rotational direction. It further includes a pair of holding members which support the meshing state of the gear wheel and the meshing portion of the driving force conversion member in the thickness direction, and which oscillate around the output shaft as a center for oscillation. This driving force conversion member includes a fixed shaft which supports and enables the pair of holding members to oscillate and which lies upon an oscillation path around the output shaft as a center for oscillation. And a one of the pair of holding members which confronts an inner wall of the hollow casing comprises a contacting portion which slides on the inner wall of the hallow casing.

20 Claims, 4 Drawing Sheets

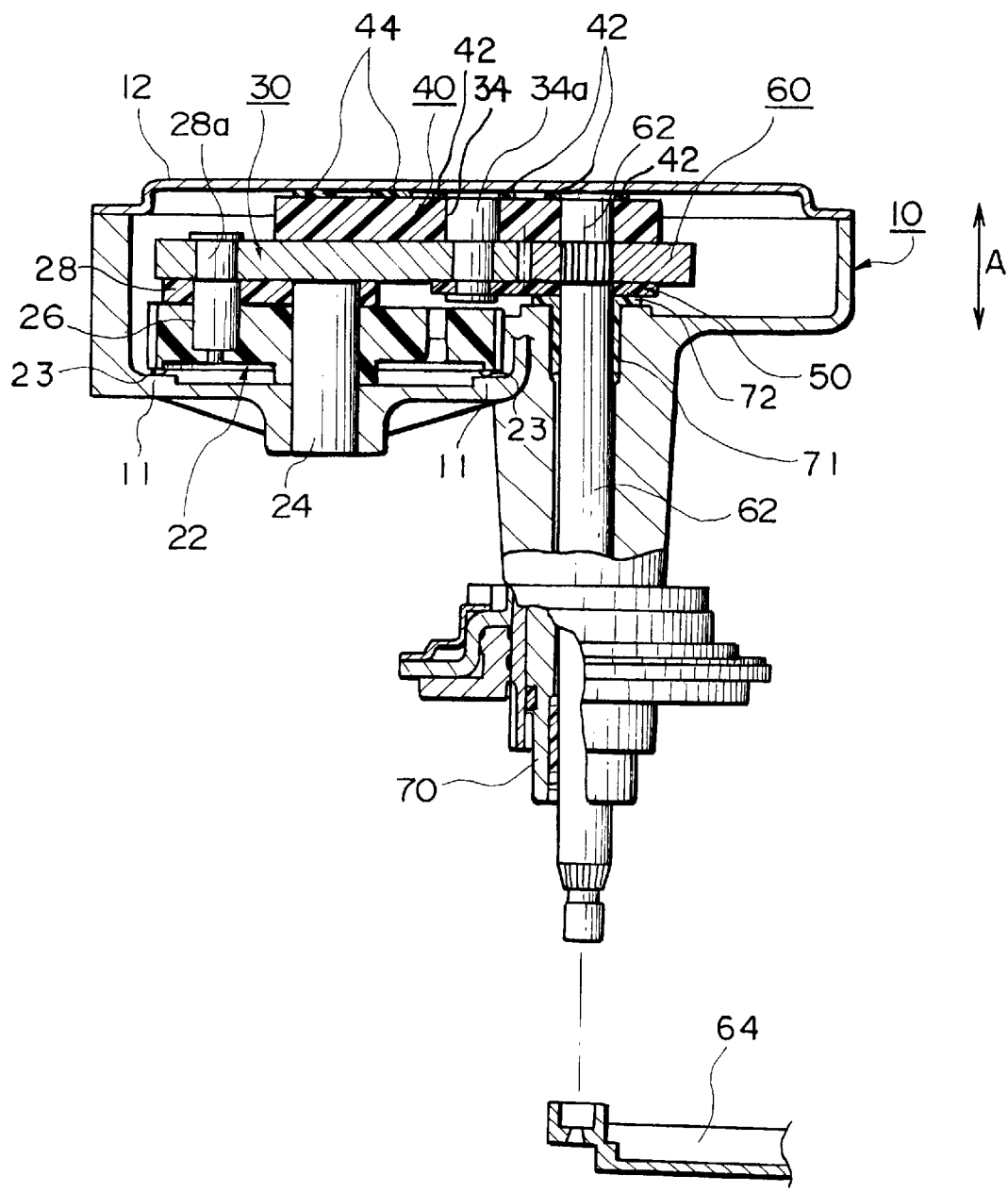

MOTOR DEVICE

BACKGROUND OF THE INVENTION

1. Field of the Invention

The present invention relates to a motor device, and in particular relates to a wiper motor for an automotive vehicle.

2. Prior Art

A typical known such motor device is, for example, the one shown in U.S. Pat. No. 5,203,219 (corresponding to Japanese Patent Application Laid-Open No. 4-292244). This device is shown in FIG. 4.

Referring to this Figure, a worm 102 is housed within a hollow casing 100 and is rotated along with the turning of a motor by being connected to a motor shaft thereof. A worm wheel 104, for which a rotational shaft 104a functions as a central axis, is meshed with this worm 102 and is rotated thereby at a reduced rotational speed. Further, a crank pin 106a is formed integrally with this worm wheel 104. A linking rod system 106 is connected to this crank pin 106a and converts the continuous rotational motion of the crank pin 106a into reversible rotational motion of an output shaft 112a.

Further, this linking rod system 106 comprises a sector shaped gear 112 which is connected to the output shaft 112a. Moreover, it comprises a crank arm 110 which functions as a sector rod, one end of which is meshed with the sector shaped gear 112 and the other end of which is supported on the crank pin 106a so as to be rotatable around the axis thereof.

Furthermore, a pair of link plates 114 and 116 which support the region of meshing in the thickness direction are included. The one ends of these link plates 114 and 116 are supported by a shaft 118 while their other ends are supported on the output shaft 112a, and together with the shaft 118 these link plates 114 and 116 execute oscillatory motion to and from around the output shaft 112a.

Furthermore, a thickened portion 120 is formed upon an inner wall of a cover 101 of the hollow casing 100, so as to be in contact with the linking rod system 106. In this construction, this thickened portion 120 is mainly formed over the entire circular path over which the crank pin 106a is moved and over a circular shaped region concentric to and surrounding the output shaft 112a.

However, the following problems arise in connection with the above described prior art motor device.

(1) Except for the region over which the crank pin 106a is rotated and the region around the end of the output shaft 112a, the thickened portion 120 is not formed over the regions adjoining the shaft 118 (and in particular over the aforementioned meshing region which is supported by the link plates 114 and 116), and accordingly an empty space 122 is left between the cover 101 and the link plate 114 and the shaft 118.

Because of this, the sector shaped gear 112 is subjected via the output shaft 112a to a considerable load in the direction shown in FIG. 4 by the arrow Z when a windshield and a wiper fitted to the output shaft 112a which are not shown in the figures are in contact and the wiper is pressed against the windshield. This causes a force (an offset load) to be imparted to the link plates 114 and 116 which tends to break the meshing engagement between the crank arm 110 and the sector shaped gear 112, and because of this the rotation of the rotation shaft 104a is not satisfactorily transmitted to the output shaft 112a. Because of the above described load, the crank arm, the sector shaped gear and so on vibrate and cannot rotate smoothly, and cannot execute stable motion, and noise is generated by this vibration.

Further, even if the thickened portion 120 is formed on the cover 101 over the region thereof above the link plate 114, then a new problem arises that the thickened portion 120 need to be made correspondingly thick and also large to have enough strength. Additionally, the requirement to provide this new dedicated member means that the number of parts is increased and the cost is higher.

(2) Except for the worm wheel 104, all of the parts are made from steel, and thus the sliding action between the parts which mutually slide against one another—in particular between the rotation shaft 104a and its bearing (not shown in the figure), between the crank arm 110 and the crank pin 106a, between the output shaft 112a and its bearing (not shown in the figure), and so on—is metal to metal sliding motion, and accordingly undue noise is caused during operation by vibration.

(3) Furthermore it might be contemplated, as a measure for solution of the above described problem (2), to fit wave washers or fixing rings for preventing detachment to the above-described portions which are in mutual sliding motion, but it would be necessary to provide a large number of such members as described above, and it is considered that this would increase the number of parts in the construction and would unduly increase the cost.

(4) The end portion 113 of the output shaft 112a is in contact with inner wall of the cover 101, and the end portion 107 of the crank pin 106a is in contact with the thickened portion 120 of the cover 101. Accordingly, there is the problem that if the paths are pursued in sliding motion over a long time period in a small contact area then the cover 101, which is made of resin, will become grooved by the sliding motion between the metallic output shaft 112a and itself and by the sliding motion between the crank pin 106a and itself.

Yet further, although for example related motor devices such as that disclosed in German Patent DE3247421 and the like have been proposed, since in these exemplary prior arts as well a space is present above the output shaft and the meshing portion, they do not solve the problem described above under (1). In addition, although various motor devices have been proposed in German Utility Model DEG8001379, Japanese Utility Model Application Laid-Open No. 5-52421, Japanese Utility Model Application Laid-Open No. 4-69358, Japanese Utility Model Application Laid-open No. 4-127061, and the like, none of these prior art proposals mentions the above problems (1) to (4) at all.

SUMMARY OF THE INVENTION

The present invention was made in order to solve the problems detailed above, and its objective is to propose a motor device in which the above described load (the offset load) is properly sustained and the meshing region between the link plates is allowed to rotate satisfactorily, and with which the noise of vibration which is generated by metal to metal sliding motion is also reduced, and moreover in which the number of parts is kept down and the cost is maintained at a minimum.

The motor device of the present invention has a hollow casing in which a mechanism for converting continuous rotational motion of a rotating member which is rotated by a motor into reciprocating oscillatory motion and rotationally drives an output shaft in a forward rotational direction and in a reverse rotational direction, comprising:

a gear wheel fixed to an output shaft;

a driving force conversion member comprising a meshing portion which is meshed with the gear wheel, which converts continuous rotational motion of the rotation member into oscillatory motion around the output shaft as a center for oscillation, and which turns the gear wheel in the forward rotational direction and in the reverse rotational direction;

and a pair of holding members which support the meshing state of the gear wheel and the meshing portion of the driving force conversion member in a thickness direction thereof, and which oscillate around the output shaft as a center for oscillation;

wherein the driving force conversion member comprises a fixed shaft which supports and enables the pair of holding members to oscillate and which lies upon an oscillation path around the output shaft as a center for oscillation; and wherein one of the pair of holding members which confronts an inner wall of the hollow casing comprises at least three contacting portions which slide on the inner wall of the hollow casing the at least three contacting portions not being aligned.

According to the present invention as described above, the following operations and benefits are provided.

(1) The one of the pair of holding members which confronts the inner wall of the hollow casing supports the meshing region, and at the same time no empty space is formed in the region which sustains the load, as was the case with the prior art, since it is formed with the contacting portion which contacts with the inner wall. Because of this, the offset load can be borne by the holding member and the wall of the hollow casing, and the various portions which are in mutual sliding motion are enabled to contact with one another with less vibration, so that the generation of noise during the sliding motion can be reduced.

(2) Since it is possible to take advantage of the holding member also as the member which is in contact with the inner wall of the hollow casing, providing any special member on the inner side of the cover is not necessary, and thereby the number of elements in the construction, and the cost during mass production can be reduced.

Further, according to a specialization of the present invention, the one of the pair of holding members comprises a plurality of thickened portions, and a thinned down portion which connects together these thickened portions, and wherein the contacting portion is formed in each region of the thickened portion.

The contacting portions are formed as thickened, and the region outside the contacting portions is formed as thinned down. Thereby, the amount of structural material, for example resin, metal, or the like which is utilized is reduced as much as possible, and accordingly lightening of the holding member and reduction of its cost can be achieved.

Further, according to another specialization of the present invention, the contacting portion of the one of the pair of holding members may be formed at least in a region adjacent to where the output shaft is disposed.

By doing this, the offset load which acts upon the driven member tends to be applied to the output shaft.

The offset load applied in the thrust direction upon the output shaft can be supported by this contacting portion, and thus it is possible to reduce vibration in this region.

Further, according to another specialization of the present invention, the contacting portion of the one of the pair of holding members may be formed at least in a region adjacent to where the fixed shaft is disposed.

By doing this, the offset load in the thrust direction tends to be applied to the fixed shaft which is formed in a position neighboring upon the output shaft. By doing this, n the region where the fixed shaft is provided, vibration caused by the offset load which is applied to the fixed shaft are reduced, and a reduction of vibrational noise and other noise can be achieved.

Further, according to a specialization of the present invention, the contacting portion of the one of the pair of holding members may be formed at least in a region adjacent to where the meshing portion of the driving force conversion member is disposed. By doing this, vibration can be reduced in this meshing region.

Further, according to a specialization of the present invention, the contacting portion of the one of the pair of holding members may be formed at least in a region adjacent to where the rotating member is disposed. By doing this, vibration can be reduced in this region in which the rotating member rotates.

Further, according to another specialization of the present invention, the contacting portion may comprise a hole into which the output shaft is inserted. By doing this, it is possible to support the holding member oscillatable around the output shaft while reducing vibration in the region of the output shaft.

Further, according to another specialization of the present invention, the contacting portion may comprise a hole in which the fixed shaft is fixed. By doing this, it is possible to fix the holding member to the fixed shaft while reducing vibration in the region of the fixed shaft.

Further, according to another specialization of the present invention, the contacting portion may be pierced by a hole in a thickness direction thereof. By doing this, the movement of the holding member can be made smoother by allowing the ingress of air into the space between the inner wall of the hollow casing and the contacting portion via the hole.

Further, according to another specialization of the present invention, the contacting portion may be formed from a material which absorbs sound generated by sliding motion.

Since one of the members which are in mutual contact is made from a material which absorbs sound generated by sliding motion while the other is made from a metallic material for example, it is possible to reduce noise comparing with metal to metal sliding motion such as occurred with the prior art. In addition, by the use of a resin material grooving of the cover will be reduced as compared with the prior art case in which a metallic materials were used in both of the cover and the contacting portion.

Further, according to another specialization of the present invention, the rotating member may comprise a convex portion which contacts with another inner wall of the hollow casing which is opposed to the inner wall of the hollow casing with which the contacting portion is in contact.

It is possible for the rotation of the rotating member to be stabilized by the provision of the convex portion upon the rotating member, and it is possible to reduce the clearance in the thrust direction which occurs between the rotating member and the inner wall of the hollow casing as much as possible. Because of this, by strengthening the contact pressure between the driving force conversion member and the inner wall of the hollow casing, in other words by ensuring the contact therebetween, vibration in the thrust direction is reduced.

Further, according to another specialization of the present invention, the convex portion may be formed from a material which absorbs sound generated by sliding motion.

Since at least one of the members which are in mutual contact can be made from a material which absorbs sound generated by sliding motion while the other can be made from a metallic material, it is possible to reduce noise compared with metal to metal sliding motion such as occurred with the prior art.

Further, according to another specialization of the present invention, the hollow casing may comprise a bearing for the output shaft, and wherein the bearing may comprise a flange portion which is in contact with the other one of the pair of holding members.

By providing the flange portion upon the bearing, it is possible to reduce the clearance in the thrust direction which occurs inside the hollow casing to the minimum practicable amount. Because of this, by strengthening the contact pressure between the driving force conversion member and the inner wall of the hollow casing, in other words by ensuring that the contact therebetween is secure, vibration in the thrust direction is reduced.

Further, according to another specialization of the present invention, the bearing may be formed from a material which absorbs sound generated by sliding motion against the output shaft.

By forming the bearing for the output shaft from a material which absorbs sound generated by sliding motion in this manner, at least one of the members which are in mutual contact can be made from a material which absorbs sound generated by sliding motion while the other can be made from a metallic material, and therefore it is possible reliably to prevent noise due to metal to metal sliding motion such as occurred with the prior art.

A wiper device of one aspect of the present invention comprises a motor device as described above. By incorporating such a motor device in the wiper device, when the wiper device performs wiper operation, vibration noise is reduced, and it is possible to offer a quiet environment.

According to another aspect of the present invention, there is provided a motor device, comprising:

a worm wheel which is housed within a hollow casing and is rotated by a motor;

an output shaft which is rotatably supported by the hollow casing;

a gear wheel fixed to the output shaft;

a crank arm which rotates together with the worm wheel;

a sector gear, including a meshing portion which is meshed with the gear wheel, which converts the continuous rotational motion of the crank arm into reciprocating oscillatory motion about the output shaft as a center for oscillation, and which reversibly rotates the gear wheel in a forward rotational direction and in a reverse rotational direction; and a pair of holding members which support the meshing state of the gear wheel and the meshing portion of the sector gear in a thickness direction thereof, and which oscillate around the output shaft as a center for oscillation;

where in the sector gear comprises a fixed shaft which supports and enables the pair of holding members to oscillate and which lies upon an oscillation path around the output shaft as a center for oscillation; and wherein one of the pair of holding members which confronts an inner wall of the hollow casing comprises a contacting portion which slides on the inner wall of the hollow casing.

The one of the pair of holding members which confronts the inner wall of the hollow casing supports the meshing region, and at the same time no empty space is formed in the region which sustains the load, as was the case with the prior art, since it is formed with the contacting portion which slides on the inner wall. Because of this, the offset load can be applied to the holding member and the wall of the hollow casing, and the various portions which are in mutual contact are enabled to slide upon one another with less vibration being generated, so that it is possible to reduce the generation of noise during this sliding motion.

Further, since it is possible to take advantage of the holding member also as a member for contact with the inner wall of the hollow casing, accordingly it is not necessary to provide any special member at the inside of the cover, and thereby the number of parts in the construction may be reduced, and accordingly a reduction in cost may be achieved.

And finally, according to yet another aspect of the present invention, there is provided a wiper device comprising a motor device as described above. By means of this, when the wiper device is being driven, vibration noise is reduced, and it is possible to provide a quiet environment.

BRIEF DESCRIPTION OF THE DRAWINGS

FIG. 2 is a partially cut away elevation view of the motor device of FIG. 1 in a state in which a driving force conversion member 30 and a holding member 40 have arrived at a position shown by X1 in FIG. 1.

PREFERRED EMBODIMENT OF THE INVENTION

In the following, a preferred embodiment of the present invention is described in concrete terms with reference to the drawings.

Figure 1:
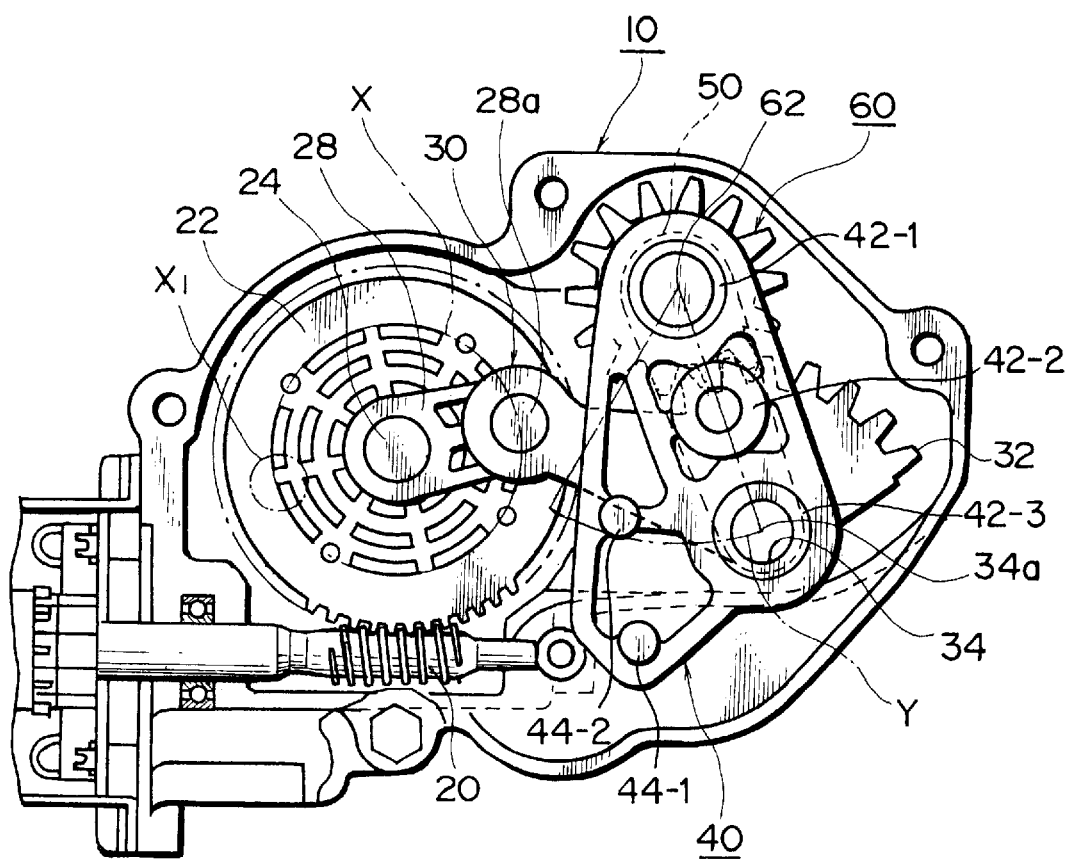
FIG. 1 is a partially cut away plan view of an embodiment of the motor device according to the present invention.
Figure 3A:
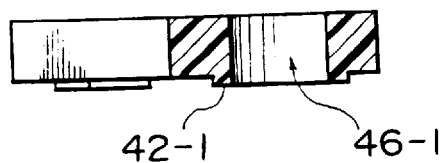
FIG. 3A is a sectional view of the driving force conversion member of the motor device of FIG. 1 taken in a plane shown by the arrows A—A in FIG. 3B, FIG. 3B. is a plan view of the driving force conversion member of the motor device of FIG. 1.
Figure 3B:
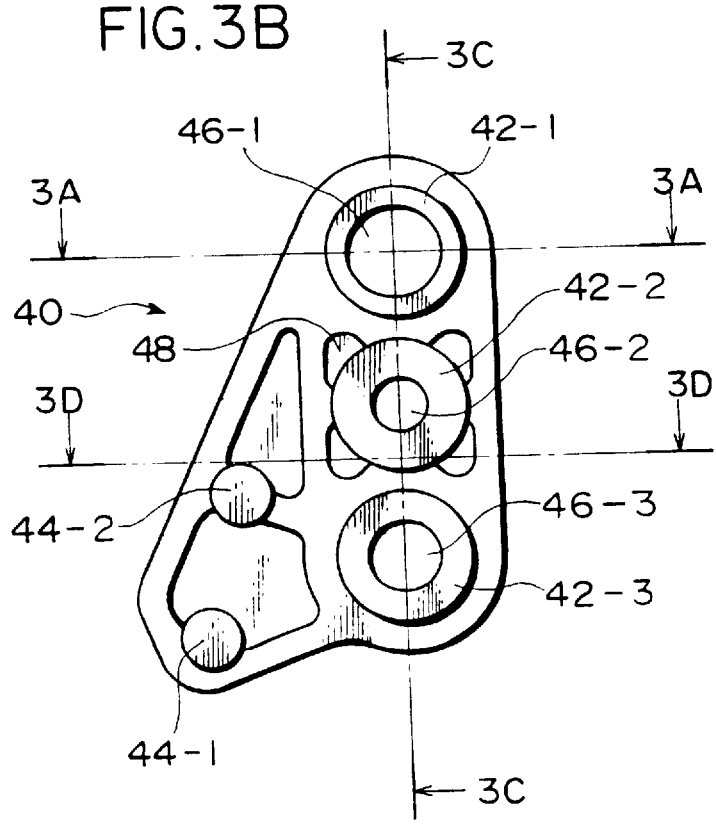
FIG. 3C is a sectional view taken in a plane shown by the arrows C—C in FIG. 3B.
FIG. 3D is a sectional view taken in a plane shown by the arrows D—D in FIG. 3B.
Figure 3C:
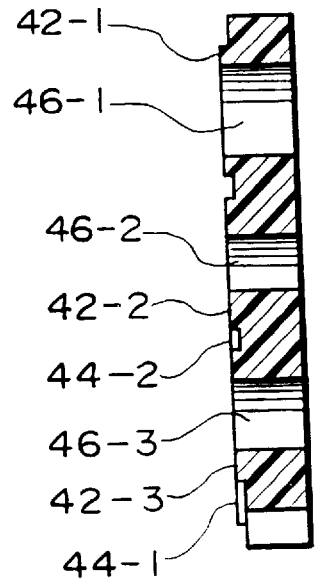
Figure 3D:
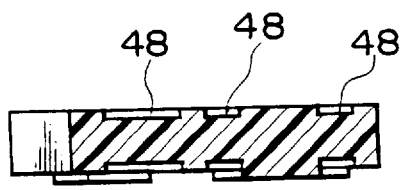
Figure 4:
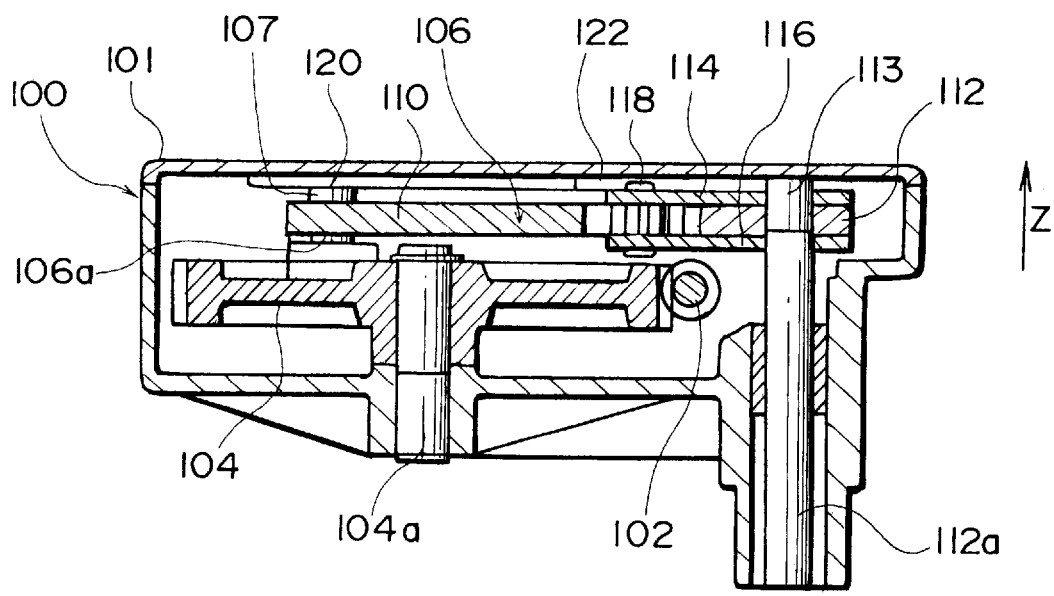
FIG. 4 is a partially cut away elevation view of a prior art motor device.

First, the overall structure of this motor device will be explained using FIGS. 1 and 2. FIG. 1 is a partially cut away plan view of this motor device according to the present invention. FIG. 2 is a partially cut away elevation view of the motor device of FIG. 1 in a state in which a driving force conversion member 30 and a holding member 40 have arrived at a position shown by X1 in FIG. 1.

As shown in FIG. 1, the motor device of the present invention comprises a worm 20 which is housed within a hollow casing 10 and which is rotated along with the driven rotation of a rotation shaft which is provided in a motor section. Further, it comprises a worm wheel 22 which is meshed with the worm 20 and which is rotated thereby at a reduced rotation speed around a gear shaft 24, thus serving as a rotating member, and a crank arm 28 which is formed as one piece upon this worm wheel 22. Moreover, a crank pin 28a is fixed to the crank arm 28 so as to be freely rotatable, thus serving as a rotation shaft. Further, a gear wheel 60 is provided, mounted on an output shaft 62. The construction further comprises a driving force conversion member 30, of which the one end is meshed with the gear wheel 60 while the other end is rotatably fixed to the crank pin 28a, and which converts the continuous rotational motion of the crank pin 28a which orbits around the gear shaft 24 as a center into to and from oscillatory motion of the gear wheel 60 around the output shaft 62 as a center. Moreover, a pair of holding members 40 and 50 are provided supporting the meshing region in the thickness direction.

Now, the hollow casing 10 which provides a gear housing may for example be formed as a metallic member, or may be made from a resin material or the like; and, as shown in FIG. 2, the upper surface of this hollow casing 10 is formed as a cover 12 which for example may be made of metal or the like, and which covers over the various mechanisms in the hollow casing 10. Further, a wiper 64 is fixed to the output shaft 62, and serves as a driven member.

Since as shown in FIG. 2 the worm wheel 22 rotates around the gear shaft 24 the lower end of which is fixed into the lower inner wall portion of the hollow casing 10 by being pressed thereinto, it is formed so as to have a smooth surface, and from a material such as a resin material or the like which is capable of absorbing the sound created by sliding motion. Moreover, the gear shaft 24 is made from a metallic material, and the worm wheel 22 rotates around this gear shaft 24 which is fixed so as not to move.

Further, a convex portion 23 which is formed in a circular ring shape is provided around the lower surface of the worm wheel 22 which confronts the lower inner wall of the hollow casing 10 near its outer periphery. This convex portion 23 is in contact with the inner wall of the hollow casing 10, and thereby tilting of the worm wheel 22 is prevented, and no vibration or the like is generated, and the worm wheel rotates stably. Moreover, the noise due to sliding motion can be reduced, because of the sliding contact between the worm wheel 22 which is made from a resin material and the lower inner wall of the hollow casing 10 which is made from a metallic material.

Moreover, as shown in FIG. 2, a thickened portion 11 is formed upon the inner lower wall portion of the hollow casing 10, and the convex portion 23 is in contact with this thickened portion 11, which is somewhat thicker than the general thickness of this lower wall portion. This thickened portion 11 is formed coaxially with the outer edge of the worm wheel 22, so as to be opposed to the region thereof upon which the convex portion 23 is formed.

On the other hand, the crank arm 28 which is in contact with the under surface of the driving force conversion member 30 is formed upon the upper surface of the worm wheel 22 which opposes the cover 12 as an integral unit therewith, and a hole 26 is formed through it in a position displaced from the gear shaft 24. The crank pin 28a is inserted into in this hole 26, with its one end engaged with the driving force conversion member 30, in a manner so as to be freely rotatable. Now, this crank pin 28a is made from a metallic material.

The driving force conversion member 30, as seen in FIG. 1, converts the continuous rotational motion of the worm wheel 22 into to and fro oscillatory motion around the output shaft 62 as a center and thus has a function of reversibly rotating the output shaft 62 in the forward and in the reverse direction, and is made from a metallic material. It is constructed so as to include a meshing portion 32 which may for example be a sector gear or the like, and which is meshed with the gear wheel 60.

Further, as shown in FIG. 2, at one end of the driving force conversion member 30 a hole is formed into which the crank pin 28a is inserted and fixed, and at its other end a hole 34 is formed into which a fixed shaft 34a is inserted. Now, this fixed shaft 34a may be made of a metallic material or the like.

The gear wheel 60 is made from a metallic material and is meshed with the meshing portion 32 of the driving force conversion member 30, and is fixed onto the output shaft 62 by being pressed thereonto and by caulking or the like so as to move as one integral unit therewith. Thereby this gear wheel 60 has the function of converting and transmitting the to and fro oscillatory motion of the meshing portion 32 of the driving force conversion member 30 into oscillating motion of the output shaft 62 in the forward and in the reverse rotational directions while either for example increasing or decreasing its speed. The gear wheel 60 may for example be a pinion gear. Moreover, in the shown preferred embodiment of the present invention, the gear wheel 60 is formed with a radius smaller than that of the meshing portion 32 of the driving force conversion member 30, and thus the gear wheel 60 is formed so as to have a speed increasing function.

As shown in FIG. 2 the pair of holding members 40 and 50 have the function of supporting the meshed state between the gear wheel 60 and the driving force conversion member 30 in the thickness direction, and comprise an upper side holding member 40 which is opposed to the inner wall of the cover 12 of the hollow casing 10, and a lower side holding member 50 which is opposed to the inner side of the lower wall of the hollow casing 10.

As shown in FIG. 1, one end of the upper side holding member 40 is supported upon the fixed shaft 34a to be coupled with the driving force conversion member 30, while its other end is supported upon the output shaft 62. This upper side holding member 40, in a state of contact with the inner wall of the cover 12 of the hollow casing 10, performs the same oscillatory motion as the driving force conversion member 30 and the fixed shaft 34a along an oscillation path Y about the output shaft 62 which reversibly rotates, as a central shaft of the oscillation. Moreover, as shown in FIG. 2, by operating together with the operation of the driving force conversion member 30, when the driving force conversion member 30 has arrived at the position X1 in FIG. 1, it also comes to cover over the upper region of the worm wheel 22.

Further, the holding member 40, as shown in FIG. 1, is formed over a region which almost covers over the meshing region between the gear wheel 60 and the meshing portion 32 of the driving force conversion member 30, and is formed from a material which is capable of absorbing sound created by sliding motion, for example from a resin material such as polyacetal or the like, and has a smooth surface of a sectional form such as that shown in FIG. 3A through 3D. Moreover, this holding member 40 possesses contacting portions 42 and 44 which are formed as somewhat thickened so as to become roughly equal to the clearance between the inner surface of the cover 12 and the upper surface of the driving force conversion member 30, and which contact with the inner surface of the cover 12. Further, it has holes, and has thinned down portions 48 which are formed in a somewhat thinned down shape.

In the present embodiment, the contacting portions 42 and 44 bulge upwards somewhat from the overall surface, and function so as to specify the contacting portions between the cover 12 and the holding member 40. As shown in FIGS. 3A through 3D, a plurality—in the shown preferred embodiment, five—of these contacting portions (42-1, 42-2, 42-3, 44-1, and 44-2) are provided. By doing this, vibration in the direction of thrust (the direction A in FIG. 2) can be supported by the inner surface of the cover 12, and it is possible to reduce vibration over the holding member 40.

Furthermore, it is possible to reduce the noise due to the sliding motion between the upper surface of the driving force conversion member 30 and the upper surface of the gear wheel (which are made of a metallic material) and the lower surface of the holding member 40 (which is made of a resin material), as compared to the prior art in which the corresponding sliding contact was metal to metal contact, and thereby a satisfactory and smooth sliding motion can be obtained. Even further, since the contacting portions 42 are made from a resin material, it is possible to reduce the noise due to the sliding motion of their upper surfaces against the rear surface of the cover 12, and also the wear due to this sliding motion can be lessened because one of the members involved is not made from metal.

Each of the contacting portions 42 is formed around one of the holes, and the fixed shaft 34a and the output shaft 62 are inserted through the holes 46-1 and 46-3 respectively, while no member is inserted through the hole 46-2. The formation of this hole 46-2 means that it is possible to enhance the smoothness of motion of the holding member 40 by allowing air to pass through this hole 46-2 to the space between the inner wall of the hollow casing and the contacting portion 42. However, it is not essential to the concept of the present invention to form this hole 46-2.

By forming the thinned down portions 48 of the holding member 40 which are thinner than the overall surface thereof, the amount of material utilized is reduced, and this contributes not only to lightening of the product but also to reduction of cost. Further, ribs are formed to link together the output shaft 62, the fixed shaft 34a and the contacting portions 42-1, 42-2, 42-3, 44-1 and 44-2 so as to reinforce them.

As for the holding member 50, at one end thereof a hole is formed in which the fixed shaft 34a is fixedly mounted to be coupled with the driving force conversion member 30, and at the other end thereof another hole is formed through which the output shaft 62 is passed. This holding member 50 performs the same oscillatory motion as the driving force conversion member 30 and the fixed shaft 34a along an oscillation path Y about the output shaft 62 as a central shaft of the oscillation; it is moreover formed from a metallic material.

The output shaft 62 is formed from a metallic material, and the bearings 70 and 71 of this output shaft 62 are formed from a material which can absorb the sound created by sliding motion (for example from a resin material) and which has a smooth surface. A flange portion 72 of this bearing 71 contacts with the lower holding member 50. It is also possible to reduce the sound due to sliding motion of the output shaft 62 by the sliding contact between the bearing 70 which is made from a resin material and the outer cylindrical surface of the output shaft 62 which is made from a metallic material. Because of this smooth sliding motion, it is possible to reduce vibration.

Further, it is possible to reduce the sound of the sliding motion of the holding member 50 due to the contact between the holding member 50 and the flange 72; and moreover, because of this smooth sliding motion, it is possible to reduce vibration.

As described above, with the motor device of the present invention, in the meshing region between the gear wheel 60 and the meshing portion 32 and the region which includes the output shaft 62, the holding member 40 and the contacting portions 42 and 44 which are formed integrally with the holding member 40 which are in contact with the inner surface of the cover 12, the driving force conversion member 30 and the gear wheel 60 which are in contact with the holding member 40, and the holding member 50 which is in contact therewith, are firmly restrained in the thrust direction (direction A in FIG. 2) by the flange portion 72 which projects from the lower inner wall of the hollow casing 10, so that the construction tends not to produce sliding contact noise, and thus there is less vibration, and satisfactory and stable sliding motion is possible.

Further, in the region of the worm wheel 22, the holding member 40 and the contacting portions 42 and 44 which are formed integrally with the holding member 40 which are in contact with the inner surface of the cover 12, the driving force conversion member 30 and the gear wheel 60 which are in contact therewith, and the worm wheel 22 which includes the crank arm 28 which is in contact therewith, are firmly restrained in the thrust direction (direction A in FIG. 2) by the convex portion 23 which is in contact with the lower inner surface of the hollow casing 10, so that the construction tends not to produce sliding contact noise, and thus there is less vibration, and satisfactory and stable sliding motion is possible.

The preferred embodiment of the present invention is constructed as described above, and in the following its effect will be described with reference to FIGS. 1, 2, 3A, 3B, 3C and 3D.

When the rotatable shaft of the motor (not shown in the figures) in the motor housing which adjoins the hollow casing 10 is rotated and the worm 20 attached thereupon also rotates, then as shown in FIG. 1 the worm wheel 22 which is meshed with the worm 20 is rotated at a reduced rotational speed. At this time, as shown in FIG. 2, tilting of the worm wheel 22 is prevented by the convex portion 23 thereof in contact with the lower inner wall of the hollow casing 10, and vibration is reduced. Moreover, the noise created by sliding motion can be reduced, because of the contact between the worm wheel 22 which is made from a resin material and the lower inner wall of the hollow casing 10 which is made from a metallic material.

Thus the worm wheel 22 rotates about the gear shaft 24, and thereby the crank pin 28a revolves along the revolving path X shown in FIG. 1, then the one end mounted upon the crank pin 28 of the driving force conversion member 30 revolves together with this, so that the other end of the driving force conversion member 30 executes oscillatory motion following along the oscillation path Y. At this time, since the meshing portion 32 of the driving force conversion member 30 executes to and fro oscillatory motion, the gear wheel 60 which is meshed therewith is caused to reversibly rotate in the forward and in the reverse rotational direction, and rotates the output shaft 62 reversibly in the forward and in the reverse rotational direction.

Now, since the pair of holding members 40 and 50 which support the meshing between the meshing portion 32 of the driving force conversion member 30 and the gear wheel 60 in the thickness direction, and the driving force conversion member 30, are supported by the fixed shaft 34a, therefore the pair of holding members 40 and 50 oscillate about the output shaft 62 as a central shaft along the oscillation path Y shown in FIG. 1.

In this connection, when the driving force conversion member 30 is in the state shown in FIG. 1, in the meshing region between the gear wheel 60 and the meshing portion 32 and the region which includes the output shaft 62, the holding member 40 and the contacting portions 42 and 44 which are formed integrally with the holding member 40 which are in contact with the inner surface of the cover 12, the driving force conversion member 30 and the gear wheel 60 which are in contact therewith, and the holding member 50 which is in contact therewith, are firmly restrained in the thrust direction (direction A in FIG. 2) by the flange portion 72 which projects from the lower inner surface of the hollow casing 10. Therefore, the construction tends not to produce sliding noise, and thus there is no play, and satisfactory and stable sliding motion is possible.

On the other hand, when the driving force conversion member 30 is in the state shown in FIG. 2, in the region of the worm wheel 22, the holding member 40 and the contacting portions 42 and 44 which are formed integrally with the holding member 40 which are in contact with the inner surface of the cover 12, the driving force conversion member 30 and the gear wheel 60 which are in contact therewith, and the worm wheel 22 which includes the crank arm 28 which is in contact therewith, are firmly restrained in the thrust direction (direction A in FIG. 2) by the convex portion 23 which is in contact with the lower inner wall of the hollow casing 10, so that the construction tends not to produce sliding contact noise, and thus there is less vibration, and satisfactory and stable sliding motion is possible.

Further, in whichever of the above described two states the system may be, since each of the various pairs of elements which are in sliding motion (the bearing 70, 71 and the output shaft 62, the cover 12 and the holding member 40, the holding member 40 and the gear wheel 60 or the driving force conversion member 30, the driving force conversion member 30 and the worm wheel 22, the worm wheel 22 and the lower inner surface of the hollow casing 10, the holding member 50 and the gear wheel 60 or the driving force conversion member 30, the holding member 60 and the lower inner surface of the hollow casing 10, the output shaft 62 and the holding member 40 or the holding member 50, and the like) includes one element which is made from a material (such as a resin material) which can well absorb noise created by sliding motion and another element made from a metallic material, accordingly the noise due to sliding motion can be reduced, in comparison to the prior art in which these various contacts were metal to metal ones.

The following advantage are obtained from the preferred embodiment of the present invention as detailed above.

(1) By structuring that one from among the pair of holding members which confronts the inner wall of the hollow casing so as to support the region which includes the meshing portion while being in contact with the inner wall, no empty space is formed over the region which bears the load as was the case with the prior art. Because of this, the offset load can be sustained by the holding member and the wall of the hollow casing, and noise during sliding motion can be reduced while maintaining a satisfactory state of oscillation for all of the parts which are in mutual sliding motion with less vibration.

(2) By taking advantage of the holding member to serve as the member which is in contact with the inner wall of the hollow casing, it is not necessary to provide any member on the inner side of the cover as was the case in the prior art, and accordingly the number of elements in the construction can be reduced and thereby achieve a reduction in cost.

(3) Since one of each of the pairs of members which are in mutual sliding contact is made from a resin material while the other is made from a metallic material, accordingly the generation of noise is reduced compare to metal to metal sliding motion as was the case with the prior art. In addition, by the use of a resin material, grooving of the cover will be reduced as compared with the prior art case in which a metallic material was used.

(4) By forming the contacting portions, the contact surface area between the inner wall of the hollow casing and the contacting portions is reduced, and wear upon the driving force conversion member which is made from a resin material can be reduced.

(5) By providing the convex portion upon the gear, it is possible to reduce as much as possible the clearance which occurs in the thrust direction. Because of this, by increasing the contact pressure between the driving force conversion member and the inner wall of the hollow casing, in other words by being able to make the contact more reliable, vibration in the thrust direction can be reduced. Further, by also forming this region from a resin material, at least one of the pairs of members which are in mutual contact may be form from a resin material while forming the other from a metallic material. Accordingly the generation of noise can be reduced comparing to metal to metal contact such as occurred in the prior art.

(6) By not only forming the bearing for the output shaft from a resin material but also providing a flange portion upon this bearing, the clearance that occurs in the direction of thrust can be reduced as much as possible. In addition, the contact pressure between the driving force conversion member and the inner wall of the hollow casing is reinforced; in other words, the contact is made more reliable, and thereby vibration in the direction of thrust can also be reduced. Further, at least one of the pairs of members which are in mutual contact may be formed from a resin material while forming the other from a metallic material, and accordingly noise can be reduced comparing to the prior art which is metal to metal contact.

As described in (3), (5), and (6) above, each of the pairs of elements which mutually contact with one another (except for the gear wheel and the driving force conversion member which are meshingly engaged together) is not a metal to metal combination, but always definitely includes a member made from a resin material. Because of this, a great advantage is obtained with regard to reduction of noise, and in particular reduction of sound intensity and pitch due to the occurrence of play during operation.

(7) Detachment and vibration of the holding member, the output shaft, the driving force conversion member, the gear wheel, is reduced by the holding member being kept in contact with the cover. For this reason it is not necessary to utilize any parts such as fixing rings or wave washers or the like to prevent detachment, and accordingly cost reduction may be achieved by a reduction in the number of constituent parts.

(8) It is possible to sustain the offset load with contacting portion, and accordingly vibration in this region can be reduced. Further, since it is acceptable not to provide any separate member for contact as in the prior art, accordingly the number of elements in the construction is reduced, and cost during mass production can be reduced. Moreover, it is possible to obtain the same operational advantages as these also in the region in which the fixed shaft is formed, in the region of the meshing portions, in the rotation region for the rotation member, and so forth.

(9) The rigidity of the holding member is enhanced by connecting together the contacting portions. In addition, by forming the regions thereof other than the portions which are in contact as thinned down, it is possible to reduce the amount of structural material such as resin, metal, or the like employed for its construction to the minimum possible, which enables a reduction in cost.

(10) By providing holes through which the output shaft and the fixed shaft are passed, the holding members can be fixed to the shafts in a state in which the one ends of the shafts are prevented from being in contact with the inner wall of the casing. Moreover, since contacting portions are formed around the shafts, grooving of the inner wall will be reduced as much as possible. Further, it is also possible to reduce vibration in the region of the shafts.

Now, although the device according to the present invention have been particularly explained in terms of the shown preferred embodiment thereof, but to those skilled in the relevant art, many variations of the embodiment disclosed in this specification will be clear without deviating from the scope of the invention. For example, although in the preferred embodiment described above the holding member and the bearing were described as being made from a resin material, in principle it would be sufficient for these members to be fabricated from any material which had a low vibration ratio, i.e. which generated only a small amount of sound and vibration during sliding motion. Further, since it is sufficient for at least only one of the members which are in mutual contact to be made from a resin material or from a material which can well absorb noise generated by sliding contact, the particular combinations are not significant.

Further, it would also be acceptable to form step portions in the holes in the holding member, having radius varying along the direction of the shafts, and for engaging portions to be formed on the output shaft and on the fixed shaft which were engaged with these step portions. This would enable reinforcement of the connection in the thrust direction Yet further, it is possible to apply the present invention to a mechanism same as the link mechanism (the crank/lever mechanism) of the above described preferred embodiment or to a motor device which is provided with a different type of mechanism.

Yet furthermore, a motor device such as the one described above can be suitably applied as a motor for a wiper device for an automobile or the like, for example. By incorporating such a motor device in a wiper device in this manner, the generation of noise by vibration is reduced when the wiper device is being driven and accordingly it is possible to offer an improvement in the quietness of the environment.

What is claimed is:

1. A motor device having a hollow casing in which a mechanism for converting continuous rotational motion of a rotating member which is rotated by a motor into reciprocating oscillatory motion and rotationally drives an output shaft in a forward rotational direction and in a reverse rotational direction, comprising:

a gear wheel fixed to said output shaft;

a driving force conversion member comprising a meshing portion which is meshed with said gear wheel, which converts continuous rotational motion of said rotation member into oscillatory motion around said output shaft as a center for oscillation, and which turns said gear wheel in the forward rotational direction and in the reverse rotational direction;

and a pair of holding members which support the meshing state of said gear wheel and said meshing portion of said driving force conversion member in a thickness direction thereof, and which oscillate around said output shaft as a center for oscillation;

wherein said driving force conversion member comprises a fixed shaft which supports and enables said pair of holding members to oscillate and which lies upon an oscillation path around said output shaft as a center for oscillation; and wherein one of said pair of holding members which confronts an inner wall of said hollow casing comprises at least three contacting portions which slide on said inner wall of said hollow casing, said at least three contacting portions not being aligned.

2. The motor device of claim 1, wherein said one of said pair of holding members comprises a plurality of thickened portions, and a thinned down portion which connects together said thickened portions, and wherein each of said at least three contacting portions is formed in each region of said thickened portion.

3. The motor device of claim 1, wherein one of said at least three contacting portions of said one of said pair of holding members is formed at least in a region adjacent to where said output shaft is disposed.

4. The motor device of claim 1, wherein one of said at least three contacting portions of said one of said pair of holding members is formed at least in a region adjacent to where said fixed shaft is disposed.

5. The motor device of claim 1, wherein one of said at least three contacting portions of said one of said pair of holding members is formed at least in a region adjacent to where said meshing portion of said driving force conversion member is disposed.

6. The motor device of claim 1, wherein one of said at least three contacting portions of said one of said pair of holding members is formed at least in a region adjacent to where said rotating member is disposed.

7. The motor device of claim 3, wherein said one of said at least three contacting portions includes a hole into which said output shaft is inserted.

8. The motor device of claim 4, wherein said one of said at least three contacting portions includes a hole in which said fixed shaft is fixed.

9. The motor device of claim 5, wherein said one of said at least three contacting portions is pierced by a hole in a thickness direction thereof.

10. The motor device of any one of claims 1 through 9, wherein said at least three contacting portions are formed from a material which absorbs sound generated by sliding motion.

11. The motor device of claim 1, wherein said rotating member comprises a convex portion which contacts with another inner wall of said hollow casing which is opposed to said inner wall of said hollow casing with which said at least three contacting portions are in contact.

12. The motor device of claim 11, wherein said convex portion is formed from a material which absorbs sound generated by sliding motion.

13. The motor device of claim 1, wherein said hollow casing includes a bearing for said output shaft, and wherein said bearing includes a flange portion which is in contact with the other one of said pair of holding members.

14. The motor device of claim 13, wherein said bearing is formed from a material which absorbs sound generated by sliding motion against said output shaft.

15. A wiper device comprising the motor device of claim 1.

16. A motor device, comprising:

a worm wheel which is housed within a hollow casing and is rotated by a motor;

an output shaft which is rotatably supported by said hollow casing;

a gear wheel fixed to said output shaft;

a crank arm which rotates together with said worm wheel;

a sector gear, including a meshing portion which is meshed with said gear wheel, which converts the continuous rotational motion of said crank arm into reciprocating oscillatory motion about said output shaft as a center for oscillation, and which reversibly rotates said gear wheel in a forward rotational direction and in a reverse rotational direction; and a pair of holding members which support the meshing state of said gear wheel and said meshing portion of said sector gear in a thickness direction thereof, and which oscillate around said output shaft as a center for oscillation;

wherein said sector gear comprises a fixed shaft which supports and enables said pair of holding members to oscillate and which lies upon an oscillation path around said output shaft as a center for oscillation; and wherein one of said pair of holding members which confronts an inner wall of said hollow casing comprises at least three contacting portions which slide on said inner wall of said hollow casing, said at least three contacting portions not being aligned.

17. wiper device comprising a motor device of claim 16, wherein said one of said pair of holding members comprises a plurality of thickened portions, and a thinned down portion which connects together said thickened portions, and wherein each of said at least three contacting portions is formed in each region of said thickened portion.

18. A motor device having a hollow casing in which a mechanism for converting continuous rotational motion of a rotating member which is rotated by a motor into reciprocating oscillatory motion and rotationally drives an output shaft in a forward rotational direction and in a reverse rotational direction, comprising:

a gear wheel fixed to said output shaft;

a driving force conversion member comprising a meshing portion which is meshed with said gear wheel, which converts continuous rotational motion of said rotation member into oscillatory motion around said output shaft as a center for oscillation, and which turns said gear wheel in the forward rotational direction and in the reverse rotational direction;

and a pair of holding members which support the meshing state of said gear wheel and said meshing portion of said driving force conversion member in a thickness direction thereof, and which oscillate around said output shaft as a center for oscillation;

wherein said driving force conversion member comprises a fixed shaft which supports and enables said pair of holding members to oscillate and which lies upon an oscillation path around said output shaft as a center for oscillation;

wherein one of said pair of holding members which confronts an inner wall of said hollow casing comprises a contacting portion which slides on said inner wall of said hollow casing;

wherein said one of said pair of holding members comprises a plurality of thickened portions, and a thinned down portion which connects together said thickened portions; and wherein said contacting portion is formed in each region of said thickened portion.

19. A motor device having a hollow casing in which a mechanism for converting continuous rotational motion of a rotating member which is rotated by a motor into reciprocating oscillatory motion and rotationally drives an output shaft in a forward rotational direction and in a reverse rotational direction, comprising:

a gear wheel fixed to said output shaft;

a driving force conversion member comprising a meshing portion which is meshed with said gear wheel, which converts continuous rotational motion of said rotation member into oscillatory motion around said output shaft as a center for oscillation, and which turns said gear wheel in the forward rotational direction and in the reverse rotational direction;

and a pair of holding members which support the meshing state of said gear wheel and said meshing portion of said driving force conversion member in a thickness direction thereof, and which oscillate around said output shaft as a center for oscillation;

wherein said driving force conversion member comprises a fixed shaft which supports and enables said pair of holding members to oscillate and which lies upon an oscillation path around said output shaft as a center for oscillation;

wherein one of said pair of holding members which confronts an inner wall of said hollow casings comprises a contacting portion which slides on said inner wall of said hollow casing; and wherein said rotating member comprises a convex portion which contacts with another inner wall of said hollow casing which is opposed to said inner wall of said hollow casing with which said contacting portion is in contact.

20. A motor device having a hollow casing in which a mechanism for converting continuous rotational motion of a rotating member which is rotated by a motor into reciprocating oscillatory motion and rotationally drives an output shaft in a forward rotational direction and in a reverse rotational direction, comprising:

a gear wheel fixed to said output shaft;

a driving force conversion member comprising a meshing portion which is meshed with said gear wheel, which converts continuous rotational motion of said rotation member into oscillatory motion around said output shaft as a center for oscillation, and which turns said gear wheel in the forward rotational direction and in the reverse rotational direction;

and a pair of holding members which support the meshing state of said gear wheel and said meshing portion of said driving force conversion member in a thickness direction thereof, and which oscillate around said output shaft as a center for oscillation;

wherein said driving force conversion member comprises a fixed shaft which supports and enables said pair of holding members to oscillate and which lies upon an oscillation path around said output shaft as a center for oscillation;

wherein one of said pair of holding members which confronts an inner wall of said hollow casing comprises a contacting portion which slides on said inner wall of said hollow casing;

wherein said hollow casing includes a bearing for said output shaft; and wherein said bearing includes a flange portion which is in contact with the other one of said pair of holding members.

* * * * *